July 18, 1933.     L. LOMBARDINI     1,918,765

VERTICAL CARD FILING CABINET

Filed March 28, 1930     2 Sheets-Sheet 1

Inventor

Luigi Lombardini

By Guido M Laudot

Attorney

July 18, 1933.  L. LOMBARDINI  1,918,765
VERTICAL CARD FILING CABINET
Filed March 28, 1930   2 Sheets-Sheet 2
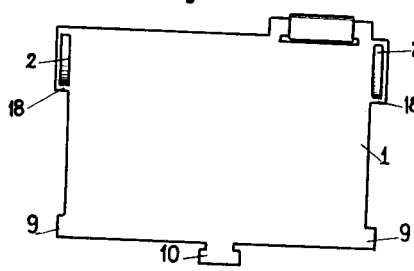
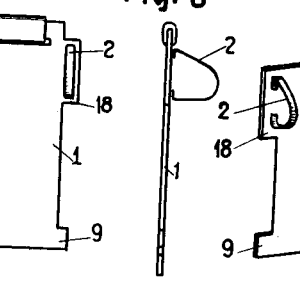
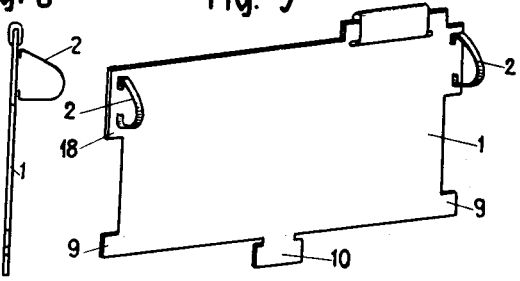
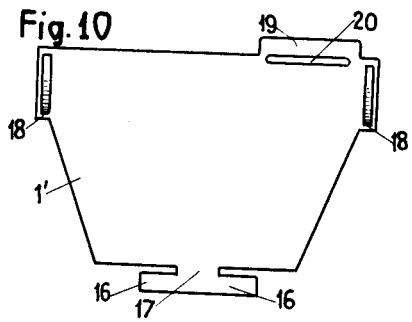
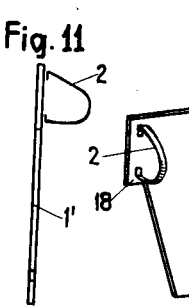
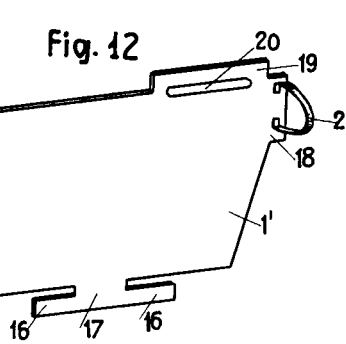
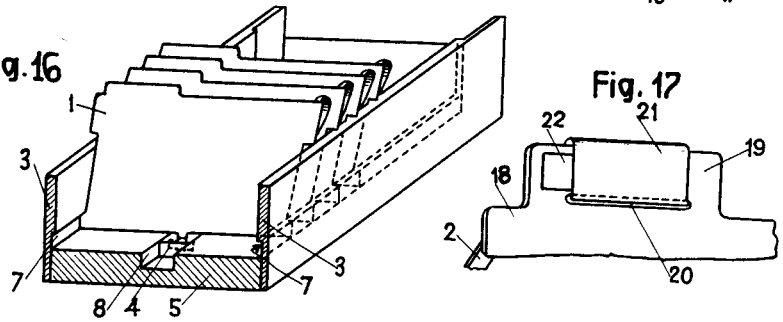
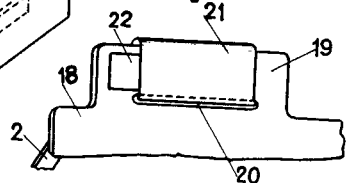
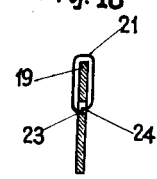
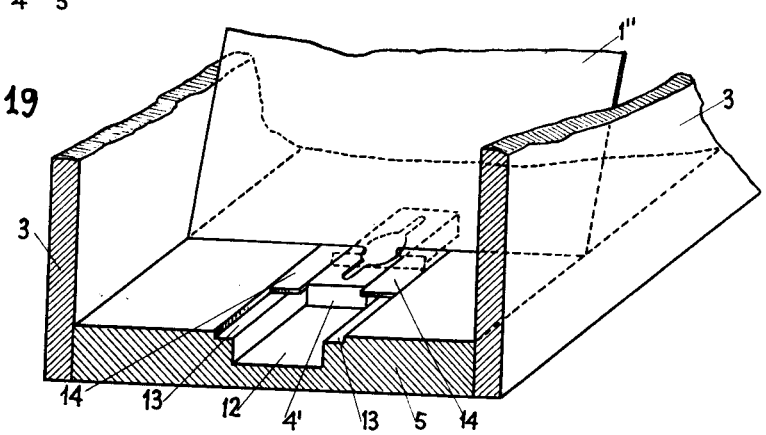
Inventor
Luigi Lombardini
By
Attorney Patented July 18, 1933

1,918,765

UNITED STATES PATENT OFFICE

LUIGI LOMBARDINI, OF TURIN, ITALY

VERTICAL CARD FILING CABINET

Application filed March 28, 1930, Serial No. 439,789, and in Italy March 29, 1929.

My invention relates to vertical card filing cabinets. By the word "cabinet" I intend to denote any kind of filing device, adapted to receive documents, cards, letters, drawings, and the like, in a substantially "vertical" position therein.

My invention has for its object generally to provide an improved filing cabinet which will be free of certain drawbacks of the known constructions, which drawbacks are due to the weight of the cards or documents in the cabinet, and to the friction to which they give rise between each other during the manipulations.

A primary object of my invention is to provide, in a vertical filing cabinet of a substantially standard construction, a number of partitions which will divide the cabinet longitudinally into a number of interchangeable compartments, there being no positive transverse engagement between any partition and the walls and/or bottom of the cabinet. A number of slippers or shoes are provided—preferably one for each partition—which will engage lugs depending from the partitions and retain the latter in the desired order within the cabinet by so engaging a central longitudinal slot in the bottom of the cabinet as to be capable of being slid therein.

By the above construction and particularly from the following specification it will be understood that any desired partition may be removed together with the slipper or shoe engaged therewith, by means of a greater or less angular rotation, about a vertical axis, from the place it occupies in the cabinet and reinserted between any two other desired partitions by merely causing the row of partitions and slippers set between the place where the partition is to be inserted, and the place of removal of said partition and slipper, to slide longitudinally of the cabinet, so as to create at the desired place a new compartment which will correspond in capacity, to the capacity determined by its slipper or shoe when in the position it occupied before removal and displacement.

A further object of my invention is to provide retaining means in the body of the cabinet and in the partitions, which means while allowing the partitions to be freely displaced or slid longitudinally of the cabinet, will positively prevent said partitions from undesirably being removed therefrom. In one embodiment of the invention such retaining means comprise lugs extending from the side edges of each partition and longitudinal slots or depressions in the side walls of the cabinet.

In another embodiment of the invention a relatively large central slot is provided in the bottom of the cabinet, the edges of said slot being covered with inwardly projecting flanges, and the partitions are provided with central bottom lugs which not only engage the corresponding slipper in the slot, but also extend laterally so as to project beneath said flanges and to be engaged therewith.

My invention will be more clearly understood by referring to the annexed drawings, showing by way of example some embodiments thereof and several details of construction.

Fig. 7 is a front view, Fig. 8 a side view, and Fig. 9 a perspective view of a partition for use with the filing device of Figs. 1, 2 and 3.

Figs. 10, 11 and 12 are similar views relating to the cabinet of Figs. 4, 5 and 6.

Fig. 16 is a part sectional perspective view, showing the filing cabinet of Figs. 1, 2 and 3 in operation.

Figs. 17 and 18 are a perspective view and a vertical section of a detail.

Fig. 19 is a part sectional perspective view, partly broken away, of a filing cabinet according to the second embodiment of this invention.

Figure 1:
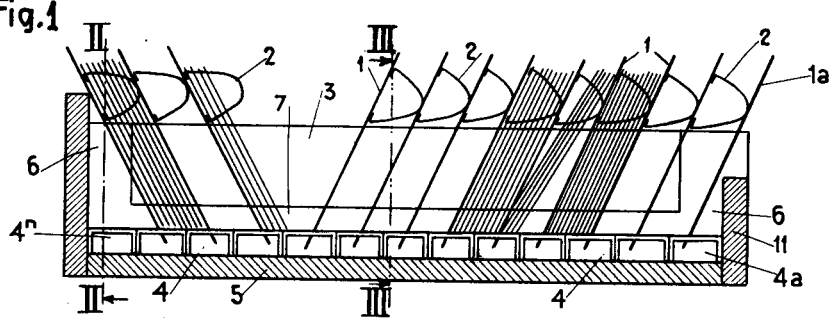
Fig. 1 shows in a longitudinal sectional view a cabinet or drawer according to the invention, having cards, and partitions in several groups and positions therein.
Figure 2:
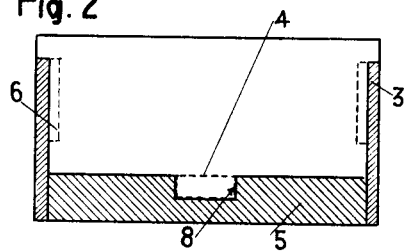
Figs. 2 and 3 are cross-sectional views of the drawer alone respectively made on lines II—II and III—III, Fig. 1.
Figure 3:
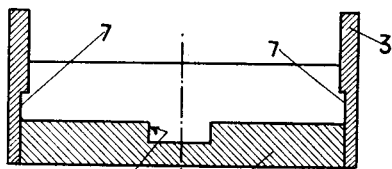
Figure 4:
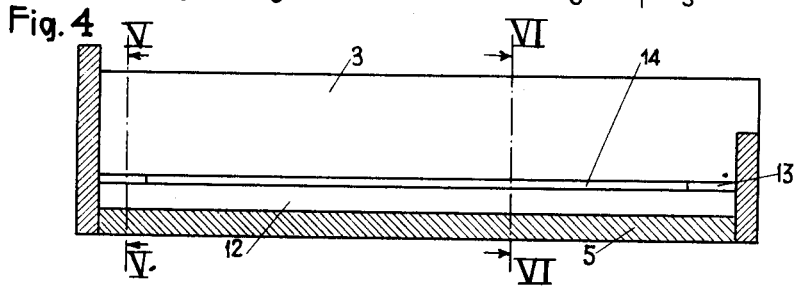
Fig. 4 is a longitudinal sectional view of an empty drawer, according to another embodiment of the invention.
Figure 5:
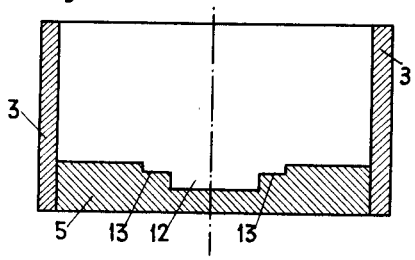
Figs. 5 and 6 are cross sectional views thereof, made on line V—V and VI—VI of Fig. 4.
Figure 6:
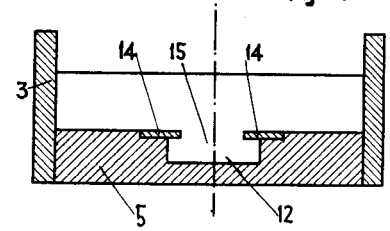

As stated in the foregoing and as appears from Fig. 1, the cabinet forming one of the features of the invention is characterized in that the available longitudinal capacity of the cabinet body or container is divided into say $n$ compartments by means of $n$ partition plates, or the like, 1.

Figure 13:
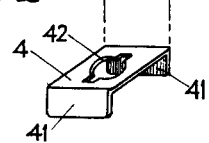
Fig. 13 is a perspective view of a retaining slipper adapted for use with the partition of Figs. 7, 8 and 9.
Figure 14:
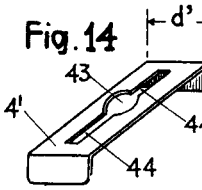
Figs. 14 and 15 are perspective views of two embodiments of slippers adapted for use with a partition as shown in Figs. 10, 11 and 12.

These partitions normally bear against each other, by means of a pair of brackets 2, of a uniform size, attached near the upper edge of each, that is, at the portion of each partition which projects above the sides 3 of the cabinet. The distance of the partitions from each other, at the bottom, is also defined by a number $(n+1)$ of removable slippers or shoes 4, 4', 4'' (Figs. 13, 14 and 15) inserted within a suitable slot in the bottom 5 of the drawer.

In the embodiment shown in Figs. 1, 2, 3, 7, 8, 9, 13 and 16, the several parts are inserted and interengaged as follows: the side walls 3 are provided near the ends with vertical recesses or channels 6 connected to each other at the bottom by a longitudinal channel 7 on each side. The bottom 5 of the cabinet is provided with a central longitudinal open top slot 8, in which slippers 4 are located adjacent to each other. The partitions 1 (Figs. 7, 8 and 9) are laterally provided at the bottom with a pair of laterally extending lugs 9 adapted to enter the vertical recesses 6 and to engage with the longitudinal channels 7 and to prevent the partitions from being vertically removed from the cabinet.

The slippers 4, the main object of which is to keep the partitions at their correct distance from each other, are brought with their opposite bent-down edges 41 adjacent to each other and are provided in their upper face with a longitudinally elongated slot 42, in which are engaged by insertion and rotation the side extensions of the lug 10 provided centrally of the lower edge of partition 1. The slippers 4 are of a breadth "$d$" equal to, or a little smaller than, the breadth of the slot 8 in the cabinet.

In the complete arrangement of a cabinet as shown in Fig. 1, the last or rear slipper $4a$ carries a rear or cover partition $1a$ which is not provided with any spring bracket, and which in operation bears against the back 11 of the drawer, said back being preferably of lesser height than the side walls, for the sake of facilitating the use of the cabinet. The first or forward free slipper $4n$ (at the left in the figure) carries no partition and is designed to enable the first partition—and consequently the following ones—to incline frontwardly, so that the said first partition will bear against the upper edge of the front wall so as to facilitate the removal and/or insertion of the cards, and even their mere rocking operations for the usual reading and consulting purposes.

In the embodiment shown in Figs. 4, 5, 6, 10, 11, 12, 14 and 19 the drawer bottom is provided with a longitudinal central slot 12 having lateral rebates 13 in which are fixed retaining strips 14 extending a portion of the length of the cabinet and adapted to project inwardly (see Figs. 6 and 19) above the sides of slot 12, leaving between each other a passage 15 of suitable breadth.

The corresponding partition 1' is centrally provided at the lower edge with a lug having two symmetrical elongated side wings 16, 16 (Figs. 10, 11 and 12) connected to the body of the partition by a reduced portion or neck 17. The corresponding slipper 4' (Fig. 14) has a breadth $d'$ substantially equal to that of passage 15 and is provided with a central opening consisting of a central hole 43 and two opposite longitudinal slots 44, 44. The diameter of hole 43 is slightly greater than the breadth of the neck 17, and the overall length of the opening is slightly greater than the overall length of wings 16, 16 of the partition lug, and is substantially equal to the amplitude of slot 12 in the bottom of the cabinet. Thus in this embodiment the central bottom lug of each partition not only engages the corresponding slipper in the slot, but also extends laterally so as to project beneath the retaining strips.

The attachment just described for the sake of example only, and particularly the opening 43—44 may be replaced by any other kind of equivalent or slot, by correspondingly varying the connecting member carried by the partition.

The initial setting of the filing cabinet according to the first embodiment is made as a rule by successively inserting the partitions with their lateral lugs 9 through one or the other pair of vertical recesses 6 provided near the ends of the cabinet, then causing them to slide along the longitudinal channels 7, the slippers 4 being engaged with the lower lugs 10, entering the central slot 8 and being slid therein so that they will be positively brought closely adjacent to each other. The slipper $4n$ is then inserted in the slot at the forward end thereof.

In order to eliminate, on the contrary, an empty or free compartment, for instance, from the back end of the cabinet, and to provide a fresh intermediate one at any other place thereof, one of the end slippers $4a$ and $4n$, or both, is, or are, removed from the slot so that the remaining ones will be capable of being spaced apart from each other at the desired place, thus facilitating the several operations; the last partition is then taken off or removed with its slipper engaged therewith and is entered in the interval at the desired place, by rotating the partition laterally through a small angle and counter-rotating it, to allow the insertion of lugs 9 in the channels 7, while preventing lug 10 from being disengaged from the slipper 4, so that finally said partition will be inserted—with its slipper engaged therewith—at the free place provided in the slot 8.

By a similar operation the same result is obtained in the example of construction shown in Figs. 4, 5, 6, 10, 11, 12 and 19.

Figure 15:
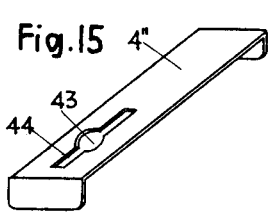

In order to obtain larger compartments, I may provide longer slippers, such as that shown in 4″, Fig. 15, by providing upper brackets 2 in the partitions, of a corresponding size.

The partitions may also advantageously be used for indicating and/or signalling purposes, and to this end they are provided at the upper edge, preferably in a standard position, with an extension 19, said extension carrying devices or provisions adapted to receive inscriptions or to retain signals, indicating strips or ribbons, and the like. This may be obtained by either making the surface of said extensions adapted to directly receive the desired ink or pencil inscriptions; or—as in the examples shown—by providing at the base of said extensions a slot 20 in which a retaining means of transparent material 21 may be engaged, said means being capable of receiving and displaying (Fig. 17) an indicating strip 22.

In the embodiment shown in Figs. 17 and 18 a double sided collar 21 is used as the retaining means and is provided with bent-in edges 23, 24, designed to engage from opposite sides the slot 20, but of course other similar constructions may be resorted to.

It will be seen that the partitions engage two longitudinal recessed runways which may be part of the groove formed in the bottom of the cabinet or which may be provided along the inner surface of the sides of said cabinet. The expression, "longitudinal recessed runways" used in some of the claims should, therefore, be understood as extending to either or other alternative modes of construction.

The constructional details of my invention may vary from those shown without departing from the inventive idea; the drawings will therefore be understood as being intended for illustrative purposes only, and not in a limiting sense. Accordingly, I reserve the right to carry my invention into practice in all those ways and manners which may enter, fairly, into the scope of the appended claims.

I claim:

1. In a vertical filing cabinet of the class specified, comprising a bottom formed with a longitudinal groove, and with two longitudinal recessed runways, a plurality of partitions insertable within said cabinet, spacing devices connectable to said partitions, slidably insertable within said groove, said spacing devices maintaining adjoining partitions at a predetermined distance from one another, and retaining means, integral with said partitions, interlocking with said runways so as to prevent removal of said partitions therefrom, when said partitions are substantially at right-angles to the sides of said cabinet.

2. In a vertical filing cabinet of the class specified, comprising a bottom formed with a longitudinal groove, a plurality of partitions insertable within said cabinet, spacing devices connectible to said partitions slidably insertable within said groove, said spacing devices maintaining adjoining partitions at a predetermined distance from one another, and spacing brackets extending from the upper part of said partitions, at each side thereof.

3. In a vertical filing cabinet of the class specified, comprising a bottom formed with a longitudinal groove, and with two longitudinal recessed runways, a plurality of partitions insertable within said cabinet, spacing devices connectible to said partitions slidably insertable within said groove, said spacing devices maintaining adjoining partitions at a predetermined distance from one another, retaining means, integral with said partitions, interlocking with said runways so as to prevent removal of said partitions therefrom, when said partitions are substantially at right-angles to the sides of said cabinet, and spacing brackets extending from the upper part of said partitions, at each side thereof.

4. In a vertical filing cabinet of the class specified, comprising a bottom formed with a longitudinal groove, a plurality of partitions insertable within said cabinet, said partitions each being formed with an inverted T-lug downwardly depending therefrom, and spacing slippers for said partitions, slidably insertable within said groove, each slipper having a longitudinal slot within which the inverted T-lug of the corresponding partition may be inserted and turned, so as to form an interlocking joint therebetween permitting front to rear swinging of said partition, said slippers maintaining adjoining partitions at a predetermined distance from one another.

5. In a vertical filing cabinet of the class specified, comprising a bottom formed with a longitudinal groove, and with two longitudinal recessed runways, a plurality of partitions insertable within said cabinet, said partitions each being formed with an inverted T-lug downwardly depending therefrom, spacing slippers for said partitions, slidably insertable within said groove, each slipper having a longitudinal slot within which the inverted T-lug of the corresponding partition may be inserted and turned, so as to form an interlocking joint therebetween permitting front to rear swinging of said partition, said slippers maintaining adjoining partitions at a predetermined distance from one another, and retaining means, integral with said partitions, interlocking with said runways so as to prevent removal of said partitions therefrom, when said partitions are substantially at right-angles to the sides of said cabinet.

6. In a vertical filing cabinet of the class specified, comprising a bottom formed with a longitudinal groove and with two longitudinal recessed runways, a plurality of partitions insertable within said cabinet, said partitions each being formed with an inverted T-lug downwardly depending therefrom, spacing slippers for said partitions, slidably insertable within said groove, each slipper having a longitudinal slot within which the inverted T-lug of the corresponding partition may be inserted and turned, so as to form an interlocking joint therebetween permitting front to rear swinging of said partition, said slippers maintaining adjoining partitions at a predetermined distance from one another, retaining means, integral with said partitions, interlocking with said runways so as to prevent removal of said partitions therefrom, when said partitions are substantially at right-angles to the sides of said cabinet, and spacing brackets extending from the upper part of said partitions, at each side thereof.

7. In a vertical filing cabinet of the class specified, comprising a bottom formed with a longitudinal groove, and with two longitudinal recessed runways, a plurality of partitions insertable within said cabinet, spacing devices connectible to said partitions, slidably insertable within said groove, said spacing devices maintaining adjoining partitions at a predetermined distance from one another, and laterally extending lugs integral with said partitions, interlocking with said runways so as to prevent removal of said partitions therefrom, when said partitions are substantially at right-angles to the sides of said cabinet.

8. A vertical filing cabinet of the class specified, comprising two sides and a bottom formed with a central longitudinal groove, retaining strips inwardly projecting from the sides of said groove, spacing slippers slidably insertable within said groove, between said strips, said slippers being each formed with a longitudinal slot, and a plurality of partitions insertable within said cabinet, each partition being formed with an inverted T-lug downwardly depending therefrom and insertable within the slot of its corresponding slipper, said slot having an enlarged portion permitting turning movement of said partition about a vertical axis, the two lateral extensions of said inverted T-lug extending sufficiently to engage said strips, preventing removal of said partitions from said cabinet, when said partitions are substantially at right-angles to the sides of said cabinet.

9. A vertical filing cabinet of the class specified, comprising two sides and a bottom formed with a central longitudinal groove, retaining strips inwardly projecting from the sides of said groove, spacing slippers slidably insertable within said groove, between said strips, and slippers being each formed with a longitudinal slot, a plurality of partitions insertable within said cabinet, each partition being formed with an inverted T-lug downwardly depending therefrom and insertable within the slot of its corresponding slipper, said slot having an enlarged portion permitting turning movement of said partition about a vertical axis, the two lateral extensions of said inverted T-lug extending sufficiently to engage said strips, preventing removal of said partitions from said cabinet, when said partitions are substantially at right-angles to the sides of said cabinet, and spacing brackets extending from the upper part of said partitions, at each side thereof.

LUIGI LOMBARDINI.